United States Patent
Kato et al.

(10) Patent No.: US 9,208,955 B2
(45) Date of Patent: Dec. 8, 2015

(54) DYE-SENSITIZED SOLAR CELL FABRICATING KIT, DYE-SENSITIZED SOLAR CELL AND METHOD OF USING THE SAME

(75) Inventors: Yasutake Kato, Inuyama (JP); Hideyumi Matsumura, Inuyama (JP); Eiji Kato, Inuyama (JP); Tadatoshi Nagasaki, Inuyama (JP)

(73) Assignee: DAIDO METAL COMPANY LTD., Aichi-Ken (JP)

( * ) Notice: Subject to any disclaimer, the term of this patent is extended or adjusted under 35 U.S.C. 154(b) by 1130 days.

(21) Appl. No.: 12/120,326

(22) Filed: May 14, 2008

(65) Prior Publication Data

US 2008/0314448 A1    Dec. 25, 2008

(30) Foreign Application Priority Data

May 17, 2007  (JP) .................................. 2007-131621
Feb. 28, 2008 (JP) .................................. 2008-047734

(51) Int. Cl.
*H01L 31/00* (2006.01)
*H01G 9/20* (2006.01)

(52) U.S. Cl.
CPC ........... *H01G 9/2013* (2013.01); *H01G 9/2004* (2013.01); *H01G 9/2059* (2013.01); *H01G 9/2077* (2013.01); *Y02E 10/542* (2013.01)

(58) Field of Classification Search
CPC . H01G 9/2004; H01G 9/2013; H01G 9/2059; H01G 9/2077; Y02E 10/542
USPC ................................................ 136/252, 263
See application file for complete search history.

(56) References Cited

U.S. PATENT DOCUMENTS

| 5,968,287 A | * | 10/1999 | Nath .............................. 136/251 |
| 2003/0127130 A1 | * | 7/2003 | Murai et al. ................... 136/263 |
| 2003/0164188 A1 | * | 9/2003 | Murai et al. ................... 136/263 |

(Continued)

FOREIGN PATENT DOCUMENTS

| JP | 2002-280085 A | 9/2002 |
| JP | 2004-264750 | 9/2004 |

(Continued)

OTHER PUBLICATIONS

English machine translation of JP 2004-264750A.*

(Continued)

*Primary Examiner* — Jonathan Johnson
*Assistant Examiner* — Lindsey Bernier
(74) *Attorney, Agent, or Firm* — Smith, Gambrell & Russell, LLP.

(57) ABSTRACT

A dye-sensitized solar cell fabricating kit for fabricating a dye-sensitized solar cell includes a semiconductor electrode having a semiconductor layer carrying a dye, an opposite electrode disposed opposite the semiconductor electrode, an electrolytic solution made by dissolving electrolyte in a solvent and caused to fill between the semiconductor electrode and the opposite electrode during an initial assembly, the electrolytic solution being supplemented when decreased after assembly, so that an electrolyte concentration at the time of supplement is lower than an electrolyte concentration of the electrolytic solution supplied during the initial assembly, and a sealing member detachably attachable to an inlet through which the electrolytic solution is supplied between the semiconductor electrode and the opposite electrode to close the inlet.

7 Claims, 13 Drawing Sheets

(56) References Cited

U.S. PATENT DOCUMENTS

| | | |
|---|---|---|
| 2004/0238826 A1 | 12/2004 | Sekiguchi et al. |
| 2005/0072458 A1* | 4/2005 | Goldstein .................... 136/251 |
| 2008/0202585 A1* | 8/2008 | Yamanaka et al. ............ 136/263 |

FOREIGN PATENT DOCUMENTS

| | | |
|---|---|---|
| JP | 2005-251736 A | 9/2005 |
| JP | 2006-108080 A | 4/2006 |
| WO | 03/098731 A1 | 11/2003 |
| WO | WO 2005069424 A1 * | 7/2005 |

OTHER PUBLICATIONS

English machine translation of JP2002-280085A.*
English machine translation of JP 2002-280085A. 2002.*
English machine translation of JP 2004-264750A. 2004.*
German Office Action dated May 28, 2009 for German Patent Application No. 08 023 454.0 w/ English language translation.
"Bau einfacher Solarzellen", Bärbel Fromme (Construction of Simple Solar Cells) (online, search of May 27, 2009, on internet:<URL:http://www.physik.umi-bielefeld.de/didaktik/Eperimente/Solar1.pdf ) (pp. 1 to 4 (with 2 pages partial translation) "2004" is indicated on cover sheet.
"Mit Früchtetee zur Sonnenzelle", Von Dr Axel Werner (Solar Cell Using Fruit Cell [online], [search of May 27, 2009] on the internet: <URL:http://webhost.homeip.net/Elektronik/Elektor/2007/de/articles/207/D0704POSTER.pdf?bcsi_scan_1BCF1BFBAB29F959=0&bcsi_scan_filename=D0704POSTER.pdf (7 pages, with 1 page partial translation) Mar. 26, 2007 stamp noted.
Notification of Reason(s) for Refusal dated Aug. 28, 2012 for Japanese Application No. 2008-047734 (English translation attached).
Notification of Reason(s) for Refusal dated Nov. 6, 2012 for Japanese Application No. 2008-047734 (English translation attached).

* cited by examiner

L2 IODIC CONCENTRATION (mmol/dm$^3$)

| | | CONVERSION EFFICIENCY (%) | RECOVERY RATE (%) |
|---|---|---|---|
| 0 | IMMEDIATELY AFTER FABRICATION | 0.056 | 100 |
| | AFTER TWO WEEKS | 0.019 | 34 |
| | RESUPPLY OF ELECTROLYTIC SOLUTION | 0.021 | 37 |
| 1 | IMMEDIATELY AFTER FABRICATION | 0.056 | 100 |
| | AFTER TWO WEEKS | 0.021 | 38 |
| | RESUPPLY OF ELECTROLYTIC SOLUTION | 0.038 | 69 |
| 5 | IMMEDIATELY AFTER FABRICATION | 0.057 | 100 |
| | AFTER TWO WEEKS | 0.018 | 32 |
| | RESUPPLY OF ELECTROLYTIC SOLUTION | 0.042 | 75 |
| 10 | IMMEDIATELY AFTER FABRICATION | 0.054 | 100 |
| | AFTER TWO WEEKS | 0.019 | 35 |
| | RESUPPLY OF ELECTROLYTIC SOLUTION | 0.049 | 90 |
| 20 | IMMEDIATELY AFTER FABRICATION | 0.054 | 100 |
| | AFTER TWO WEEKS | 0.018 | 33 |
| | RESUPPLY OF ELECTROLYTIC SOLUTION | 0.051 | 95 |
| 30 | IMMEDIATELY AFTER FABRICATION | 0.052 | 100 |
| | AFTER TWO WEEKS | 0.015 | 29 |
| | RESUPPLY OF ELECTROLYTIC SOLUTION | 0.047 | 91 |
| 40 | IMMEDIATELY AFTER FABRICATION | 0.052 | 100 |
| | AFTER TWO WEEKS | 0.019 | 37 |
| | RESUPPLY OF ELECTROLYTIC SOLUTION | 0.036 | 69 |
| 50 | IMMEDIATELY AFTER FABRICATION | 0.057 | 100 |
| | AFTER TWO WEEKS | 0.018 | 31 |
| | RESUPPLY OF ELECTROLYTIC SOLUTION | 0.042 | 73 |

| ELECTROLYTE CONCENTRATION OF SUPPLEMENTARY ELECTROLYTIC SOLUTION | EXPERIMENTAL RUN NUMBER | FIRST SUPPLEMENT OF ELECTROLYTIC SOLUTION | CONVERSION EFFICIENCY (%) | RECOVERY RATE (%) |
|---|---|---|---|---|
| 0 mM (TPAI 0.5 M) | 1 | IMMEDIATELY AFTER FABRICATION | 0.056 | 100 |
| | | AFTER TWO WEEKS | 0.019 | 34 |
| | | AFTER SUPPLEMENT OF ELECTROLYTIC SOLUTION | 0.021 | 37 |
| 1 mM (TPAI 0.5 M) | 2 | IMMEDIATELY AFTER FABRICATION | 0.056 | 100 |
| | | AFTER TWO WEEKS | 0.021 | 38 |
| | | AFTER SUPPLEMENT OF ELECTROLYTIC SOLUTION | 0.038 | 69 |
| 5 mM (TPAI 0.5 M) | 3 | IMMEDIATELY AFTER FABRICATION | 0.057 | 100 |
| | | AFTER TWO WEEKS | 0.018 | 32 |
| | | AFTER SUPPLEMENT OF ELECTROLYTIC SOLUTION | 0.042 | 75 |
| 10 mM (TPAI 0.5 M) | 4 | IMMEDIATELY AFTER FABRICATION | 0.054 | 100 |
| | | AFTER TWO WEEKS | 0.018 | 33 |
| | | AFTER SUPPLEMENT OF ELECTROLYTIC SOLUTION | 0.048 | 90 |
| 15 mM (TPAI 0.5 M) | 5 | IMMEDIATELY AFTER FABRICATION | 0.052 | 100 |
| | | AFTER TWO WEEKS | 0.016 | 30 |
| | | AFTER SUPPLEMENT OF ELECTROLYTIC SOLUTION | 0.047 | 90 |

FIG. 5B

FIRST SUPPLEMENT OF ELECTROLYTIC SOLUTION

| ELECTROLYTE CONCENTRATION OF SUPPLEMENTARY ELECTROLYTIC SOLUTION | EXPERIMENTAL RUN NUMBER | | CONVERSION EFFICIENCY (%) | RECOVERY RATE (%) |
|---|---|---|---|---|
| 20 mM (TPAI 0.5 M) | 6 | IMMEDIATELY AFTER FABRICATION | 0.055 | 100 |
| | | AFTER TWO WEEKS | 0.018 | 32 |
| | | AFTER SUPPLEMENT OF ELECTROLYTIC SOLUTION | 0.052 | 94 |
| 25 mM (TPAI 0.5 M) | 7 | IMMEDIATELY AFTER FABRICATION | 0.056 | 100 |
| | | AFTER TWO WEEKS | 0.017 | 30 |
| | | AFTER SUPPLEMENT OF ELECTROLYTIC SOLUTION | 0.052 | 92 |
| 30 mM (TPAI 0.5 M) | 8 | IMMEDIATELY AFTER FABRICATION | 0.053 | 100 |
| | | AFTER TWO WEEKS | 0.015 | 29 |
| | | AFTER SUPPLEMENT OF ELECTROLYTIC SOLUTION | 0.048 | 91 |
| 40 mM (TPAI 0.5 M) | 9 | IMMEDIATELY AFTER FABRICATION | 0.052 | 100 |
| | | AFTER TWO WEEKS | 0.019 | 37 |
| | | AFTER SUPPLEMENT OF ELECTROLYTIC SOLUTION | 0.036 | 69 |
| 50 mM (TPAI 0.5 M) | 10 | IMMEDIATELY AFTER FABRICATION | 0.057 | 100 |
| | | AFTER TWO WEEKS | 0.018 | 31 |
| | | AFTER SUPPLEMENT OF ELECTROLYTIC SOLUTION | 0.042 | 73 |

| ELECTROLYTE CONCENTRATION OF SUPPLEMENTARY ELECTROLYTIC SOLUTION | EXPERIMENTAL RUN NUMBER | SECOND SUPPLEMENT OF ELECTROLYTIC SOLUTION | CONVERSION EFFICIENCY (%) | RECOVERY RATE (%) |
|---|---|---|---|---|
| 10 mM (TPAI 0.5 M) | 11 | IMMEDIATELY AFTER FIRST SUPPLEMENT | 0.052 | 100 |
| | | AFTER LAPSE OF ANOTHER TWO WEEKS | 0.017 | 33 |
| | | AFTER SECOND SUPPLEMENT OF ELECTROLYTIC SOLUTION | 0.045 | 86 |
| 15 mM (TPAI 0.5 M) | 12 | IMMEDIATELY AFTER FIRST SUPPLEMENT | 0.055 | 100 |
| | | AFTER LAPSE OF ANOTHER TWO WEEKS | 0.017 | 31 |
| | | AFTER SECOND SUPPLEMENT OF ELECTROLYTIC SOLUTION | 0.050 | 90 |
| 20 mM (TPAI 0.5 M) | 13 | IMMEDIATELY AFTER FIRST SUPPLEMENT | 0.053 | 100 |
| | | AFTER LAPSE OF ANOTHER TWO WEEKS | 0.016 | 30 |
| | | AFTER SECOND SUPPLEMENT OF ELECTROLYTIC SOLUTION | 0.049 | 93 |

FIG. 6A

| ELECTROLYTE CONCENTRATION OF SUPPLEMENTARY ELECTROLYTIC SOLUTION | EXPERIMENTAL RUN NUMBER | SECOND SUPPLEMENT OF ELECTROLYTIC SOLUTION | CONVERSION EFFICIENCY (%) | RECOVERY RATE (%) |
|---|---|---|---|---|
| 25 mM (TPAI 0.5 M) | 14 | IMMEDIATELY AFTER FIRST SUPPLEMENT | 0.052 | 100 |
| | | AFTER LAPSE OF ANOTHER TWO WEEKS | 0.018 | 35 |
| | | AFTER SECOND SUPPLEMENT OF ELECTROLYTIC SOLUTION | 0.049 | 94 |
| 30 mM (TPAI 0.5 M) | 15 | IMMEDIATELY AFTER FIRST SUPPLEMENT | 0.054 | 100 |
| | | AFTER LAPSE OF ANOTHER TWO WEEKS | 0.018 | 33 |
| | | AFTER SECOND SUPPLEMENT OF ELECTROLYTIC SOLUTION | 0.050 | 92 |
| 40 mM (TPAI 0.5 M) | 16 | IMMEDIATELY AFTER FIRST SUPPLEMENT | 0.053 | 100 |
| | | AFTER LAPSE OF ANOTHER TWO WEEKS | 0.016 | 30 |
| | | AFTER SECOND SUPPLEMENT OF ELECTROLYTIC SOLUTION | 0.044 | 83 |

| THIRD SUPPLEMENT OF ELECTROLYTIC SOLUTION | | | | |
|---|---|---|---|---|
| ELECTROLYTE CONCENTRATION OF SUPPLEMENTARY ELECTROLYTIC SOLUTION | EXPERIMENTAL RUN NUMBER | | CONVERSION EFFICIENCY (%) | RECOVERY RATE (%) |
| 15 mM (TPAI 0.5 M) | 17 | IMMEDIATELY AFTER SECOND SUPPLEMENT | 0.051 | 100 |
| | | AFTER LAPSE OF FURTHER ANOTHER TWO WEEKS | 0.015 | 29 |
| | | AFTER THIRD SUPPLEMENT OF ELECTROLYTIC SOLUTION | 0.041 | 80 |
| 20 mM (TPAI 0.5 M) | 18 | IMMEDIATELY AFTER SECOND SUPPLEMENT | 0.052 | 100 |
| | | AFTER LAPSE OF FURTHER ANOTHER TWO WEEKS | 0.016 | 31 |
| | | AFTER THIRD SUPPLEMENT OF ELECTROLYTIC SOLUTION | 0.047 | 90 |
| 25 mM (TPAI 0.5 M) | 19 | IMMEDIATELY AFTER SECOND SUPPLEMENT | 0.048 | 100 |
| | | AFTER LAPSE OF FURTHER ANOTHER TWO WEEKS | 0.016 | 33 |
| | | AFTER THIRD SUPPLEMENT OF ELECTROLYTIC SOLUTION | 0.043 | 90 |
| 30 mM (TPAI 0.5 M) | 20 | IMMEDIATELY AFTER SECOND SUPPLEMENT | 0.049 | 100 |
| | | AFTER LAPSE OF FURTHER ANOTHER TWO WEEKS | 0.018 | 37 |
| | | AFTER THIRD SUPPLEMENT OF ELECTROLYTIC SOLUTION | 0.045 | 92 |
| 40 mM (TPAI 0.5 M) | 21 | IMMEDIATELY AFTER SECOND SUPPLEMENT | 0.047 | 100 |
| | | AFTER LAPSE OF FURTHER ANOTHER TWO WEEKS | 0.018 | 38 |
| | | AFTER THIRD SUPPLEMENT OF ELECTROLYTIC SOLUTION | 0.041 | 88 |

FIG.8

| | | FOURTH SUPPLEMENT OF ELECTROLYTIC SOLUTION | | |
|---|---|---|---|---|
| ELECTROLYTE CONCENTRATION OF SUPPLEMENTARY ELECTROLYTIC SOLUTION | EXPERIMENTAL RUN NUMBER | | CONVERSION EFFICIENCY (%) | RECOVERY RATE (%) |
| 20 mM (TPAI 0.5 M) | 22 | IMMEDIATELY AFTER THIRD SUPPLEMENT | 0.048 | 100 |
| | | AFTER LAPSE OF STILL FURTHER ANOTHER TWO WEEKS | 0.016 | 33 |
| | | AFTER FOURTH SUPPLEMENT OF ELECTROLYTIC SOLUTION | 0.036 | 74 |
| 25 mM (TPAI 0.5 M) | 23 | IMMEDIATELY AFTER THIRD SUPPLEMENT | 0.045 | 100 |
| | | AFTER LAPSE OF STILL FURTHER ANOTHER TWO WEEKS | 0.018 | 40 |
| | | AFTER FOURTH SUPPLEMENT OF ELECTROLYTIC SOLUTION | 0.032 | 71 |
| 30 mM (TPAI 0.5 M) | 24 | IMMEDIATELY AFTER THIRD SUPPLEMENT | 0.043 | 100 |
| | | AFTER LAPSE OF STILL FURTHER ANOTHER TWO WEEKS | 0.015 | 35 |
| | | AFTER FOURTH SUPPLEMENT OF ELECTROLYTIC SOLUTION | 0.034 | 78 |
| 40 mM (TPAI 0.5 M) | 25 | IMMEDIATELY AFTER THIRD SUPPLEMENT | 0.046 | 100 |
| | | AFTER LAPSE OF STILL FURTHER ANOTHER TWO WEEKS | 0.016 | 35 |
| | | AFTER FOURTH SUPPLEMENT OF ELECTROLYTIC SOLUTION | 0.034 | 74 |

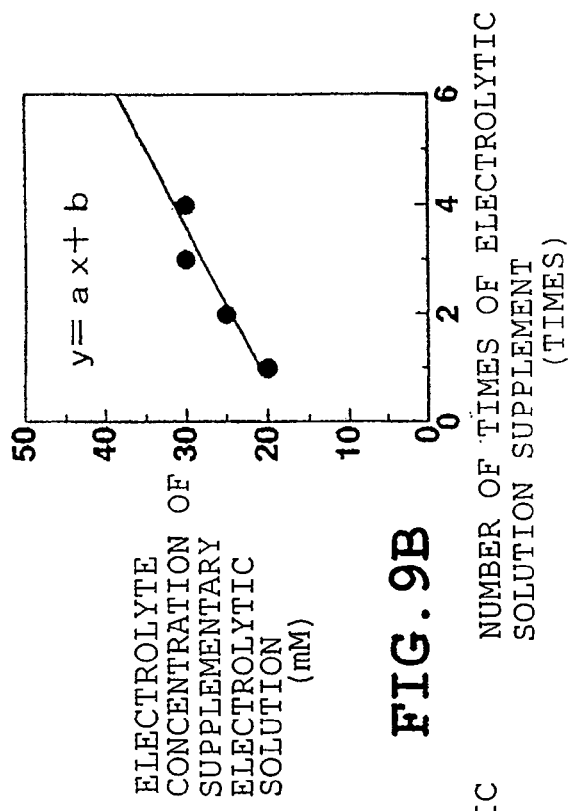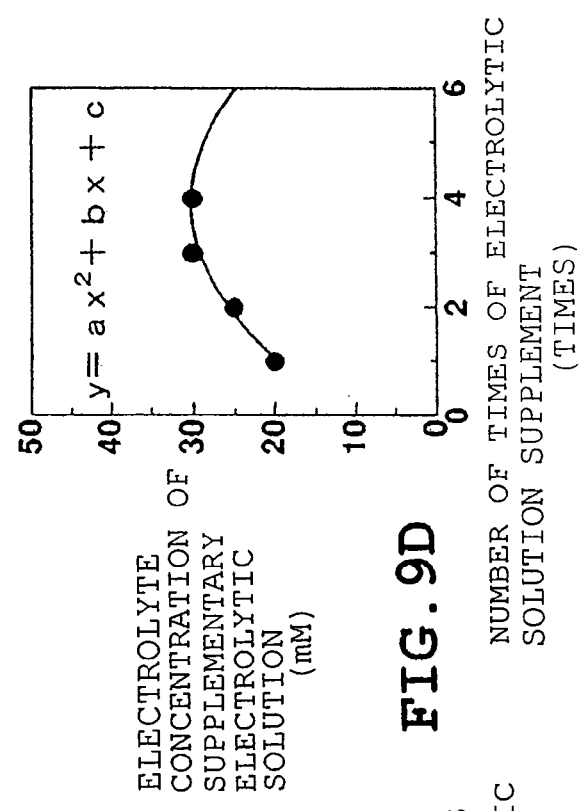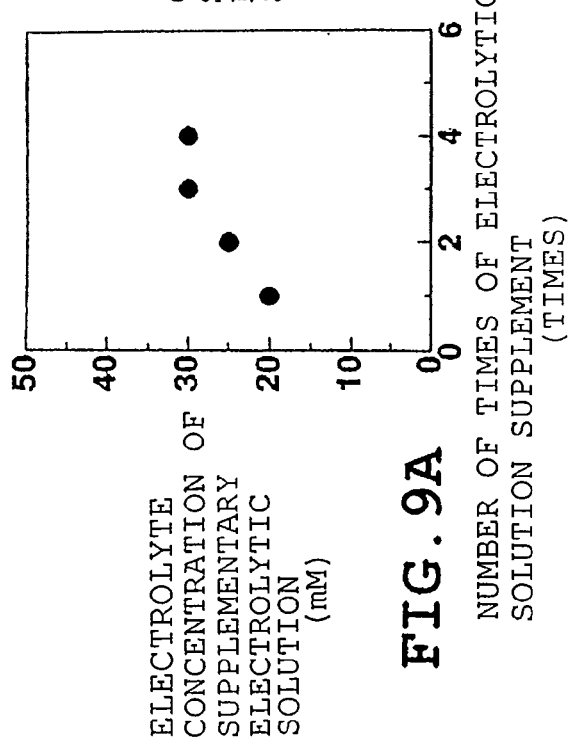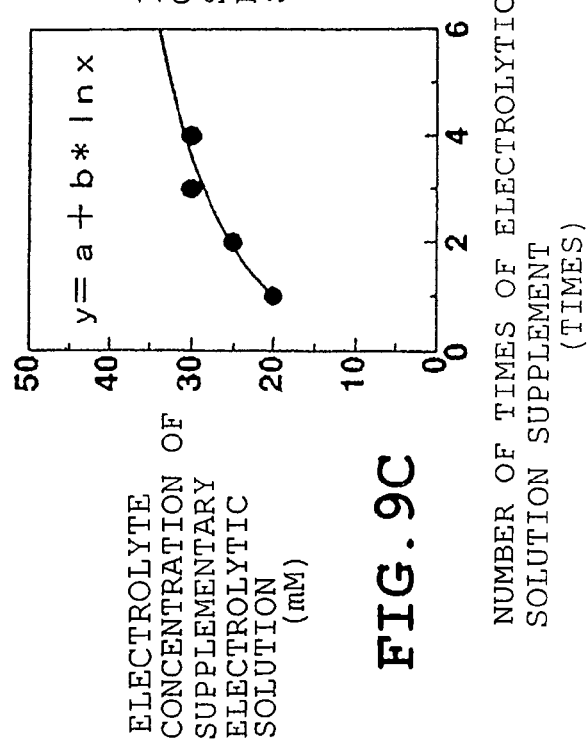

DYE-SENSITIZED SOLAR CELL FABRICATING KIT, DYE-SENSITIZED SOLAR CELL AND METHOD OF USING THE SAME

CROSS-REFERENCE TO RELATED APPLICATIONS

This application is based upon and claims the benefit of priority from the prior Japanese Patent Application Nos. 2007-131621 filed on May. 17, 2007 and 2008-47734 filed on Feb. 28, 2008, the entire contents of which are incorporated herein by reference.

BACKGROUND OF THE INVENTION

1. Field of the Invention

The present invention relates to a dye-sensitized solar cell fabricating kit for fabricating a dye-sensitized solar cell comprising a semiconductor electrode having a semiconductor layer carrying dyes, an opposite electrode disposed opposite the semiconductor electrode and electrolytic solution filling between the semiconductor electrode and the opposite electrode, a dye-sensitized solar cell and a method of using the same.

2. Description of the Related Art

A dye-sensitized solar cell basically comprises a semiconductor electrode having a semiconductor layer carrying dyes, an opposite electrode disposed opposite the semiconductor electrode and electrolytic solution filling between the semiconductor electrode and the opposite electrode. A kit for fabricating a dye-sensitized solar cell has recently been proposed for use in school education or the like. JP-A-2004-264750 discloses such a dye-sensitized solar cell kit. The fabricating kit includes, as kit components, two transparent resin substrates (polyethylene terephthalate (PET) film) having surfaces which are coated with conductive layers (indium tin oxide (ITO)) respectively, semiconductor particles and a binder (carboxymethylcellulos (CMC)) both for forming a semiconductor layer, a sensitizing dye (ruthenium complex), electrolyte (lithium iodide and iodine) and a liquid retention member (nonwoven cloth).

A dye-sensitized solar cell is fabricated through the following process. Firstly, semiconductor particles are blended with water with dissolved binder so that a dispersion liquid is prepared. The dispersion liquid is applied to a conductive layer of one of the resin substrates and then heated and pressurized thereby to be formed into a semiconductor electrode. Subsequently, the semiconductor electrode is soaked in an ethanol solution containing a sensitizing dye so that a dye carrying process is carried out. On the other hand, a pencil tip is rubbed on a conductor layer of the other resin substrate, whereby an opposite electrode is formed. Furthermore, the electrolyte is dissolved in water so that an electrolytic solution is prepared. The liquid retention member is interposed between the conductor electrode and the opposite electrode, then being soaked in the aforesaid electrolytic solution, whereby a solar cell is configured.

A constant cell performance (a conversion efficiency at which solar light energy is converted to electric power) is achieved immediately after preparation. However, leakage or evaporation (volatilization) of the electrolytic solution progresses with lapse of time. Accordingly, the cell performance is deteriorated in a relatively shorter period (short period), whereupon the solar cell cannot stand long use.

In this case, it may be considered that the solar cell is configured so that the electrolytic solution is rendered difficult to leak and that the cell performance is recovered by compensating for the reduced electrolytic solution. However, the research conducted by the inventors shows that even when the same amount of electrolytic solution as an amount of leakage is re-supplied simply, the cell performance cannot always be recovered sufficiently as compared with an initial cell performance (conversion efficiency).

SUMMARY OF THE INVENTION

Therefore, an object of the present invention is to provide a dye-sensitized solar cell fabricating kit which can suppress deterioration of cell performance with decrease in the electrolytic solution and can provide a long-time service, and such a dye-sensitized solar cell and a method of using the same.

In an electrolytic solution used in a dye-sensitized solar cell, an electrolyte or solute has a proper amount or electrolyte concentration relative to an amount of electrolytic solution from a viewpoint of performance or of obtaining a conversion efficiency as high as possible. The cell performance is reduced when the electrolyte concentration is higher as well as lower than the aforesaid proper electrolyte concentration. The aforesaid proper electrolyte concentration is of course an initial electrolyte concentration of electrolytic solution at the time of assembly of the dye-sensitized solar cell.

The inventors focused on the electrolyte concentration and conducted various experiments and research. Consequently, the inventors confirmed that the cell performance recovered desirably when an electrolyte concentration of supplementary electrolytic solution is rendered lower than the initial concentration in the case where the reduced electrolytic solution is supplemented with lapse of time, having thereupon made the invention. Since the reduction of the electrolytic solution mainly results from evaporation or volatilization of the solvent, the concentration of the electrolytic solution is increased or the electrolyte is concentrated. It is speculated that the proper electrolytic solution concentration is maintained by supplementing the electrolytic solution so that the electrolytic solution is thinned in the aforesaid state.

The present invention provides a dye-sensitized solar cell fabricating kit for fabricating a dye-sensitized solar cell, comprising a semiconductor electrode having a semiconductor layer carrying a dye, an opposite electrode disposed opposite the semiconductor electrode, and an electrolytic solution made by dissolving an electrolyte in a solvent and caused to fill between the semiconductor electrode and the opposite electrode during an initial assembly, the electrolytic solution being supplemented when decreased after assembly, so that an electrolyte concentration thereof at the time of supplement is lower than an electrolyte concentration of supplied during the initial assembly, and a sealing member detachably attachable to an inlet through which the electrolytic solution is supplied between the semiconductor electrode and the opposite electrode, thereby closing the inlet.

According to the above-described kit, the cell performance can be recovered by supplementing the electrolytic solution when the electrolytic solution is reduced with the leakage or evaporation (volatilization) of the electrolytic solution progress with lapse of time. In this case, since the electrolyte concentration of the supplemented electrolytic solution is lower than the initial electrolyte concentration, the electrolytic solution is maintained at a proper electrolyte concentration even after supplement of the electrolytic solution, whereupon the cell performance can be recovered desirably.

In one embodiment, the electrolytic solution includes, as kit components, an initial supply electrolytic solution having a necessary electrolyte concentration and a supplementary electrolytic solution having a lower electrolyte concentration than the initial supply electrolytic solution. Alternatively, the dye-sensitized solar cell fabricating kit further comprises, as kit components, a solvent and electrolyte both for adjusting the electrolytic solution, the solvent and the electrolyte being independent of each other. In the kit, the electrolytic solution includes an initial supply electrolytic solution having a necessary electrolyte concentration and a supplementary electrolytic solution having a lower electrolyte concentration than the initial supply electrolytic solution. The initial supply and supplementary electrolytic solutions are adjustable by the solvent and the electrolyte.

In another embodiment, the electrolytic solution has a higher electrolyte concentration than used in the initial assembly, and the kit further comprises a thinner for thinning the electrolytic solution. The electrolytic solution having the higher electrolyte concentration and the thinner are independent of each other. An initial supply electrolytic solution having a necessary electrolyte concentration and a supplementary electrolytic solution having a lower electrolyte concentration than the initial supply electrolytic solution are prepared using said electrolytic solution having the higher electrolyte concentration and the thinner. In both embodiments, the initial supply electrolytic solution and the supplementary electrolytic solution both having respective target electrolyte concentrations can easily be obtained.

In further another embodiment, a thinner is provided for thinning the electrolytic solution. In the kit, the electrolytic solution includes an initial supply electrolytic solution having a necessary electrolytic concentration and a supplementary electrolytic solution having a lower electrolyte concentration than the initial supply electrolytic solution. The initial electrode and the thinner are independent of each other. The initial supply and supplementary electrolytic solutions are adjustable by the thinner. In both embodiments, the initial supply electrolytic solution having a target electrolyte concentration and the supplementary electrolytic solution can easily be obtained.

In further another embodiment, a thinner is provided for thinning the electrolytic solution. In the kit, the electrolytic solution includes an initial supply electrolytic solution having a necessary electrolytic concentration and a supplementary electrolytic solution having a lower electrolyte concentration than the initial supply electrolytic solution. The initial electrode and the thinner are independent of each other. The initial supply and supplementary electrolytic solutions are adjustable by the thinner. In both embodiments, the initial supply electrolytic solution having a target electrolyte concentration and the supplementary electrolytic solution can easily be obtained.

In further another embodiment, the dye-sensitized solar cell fabricating kit further comprises a bonding member defining a space retaining the electrolytic solution between the semiconductor electrode and the opposite electrode and bonding the semiconductor electrode and the opposite electrode together while an inlet for the electrolytic solution is ensured, and a sealing member detachably attachable to the inlet thereby to close the inlet. According to this embodiment, the reduction of the electrolytic solution due to leakage or evaporation can be suppressed more effectively.

In further another embodiment, the dye-sensitized solar cell fabricating kit further comprises an electrolytic solution retaining member disposed between the semiconductor electrode and the opposite electrode to retain the electrolytic solution. In this case, too, the leakage of the electrolytic solution can be suppressed. Furthermore, a suitable cell gap is maintained between the semiconductor electrode and the opposite electrode, whereupon a short circuit can be prevented between the electrodes.

The invention also provides a dye-sensitized solar cell comprising a semiconductor electrode having a semiconductor layer carrying a dye, an opposite electrode disposed opposite the semiconductor electrode, an electrolytic solution made by dissolving an electrolytic solution in a solvent and caused to fill between the semiconductor electrode and the opposite electrode during an initial assembly, the electrolytic solution being supplemented when decreased after assembly, so that a concentration of electrolyte at the time of supplement is lower than a concentration of electrolyte supplied during the initial assembly, and a sealing member detachably attachable to an inlet through which the electrolytic solution is supplied between the semiconductor electrode and the opposite electrode, thereby closing the inlet.

The invention further provides a method of using a dye-sensitized solar cell including a semiconductor electrode having a semiconductor layer carrying a dye, an opposite electrode disposed opposite the semiconductor electrode and an electrolytic solution made by dissolving electrolytic solution in a solvent and caused to fill between the semiconductor electrode and the opposite electrode during an initial assembly. The method comprises filling a space between the semiconductor electrode and the opposite electrode with an initial supply electrolytic solution having a necessary electrolytic solution concentration during an initial assembly, and supplementing the electrolytic solution with a supplementary electrolytic solution having a lower electrolyte concentration than the initial supply electrolytic solution, when the electrolytic solution is decreased after assembly.

According to the dye-sensitized solar cell and the using method, the cell performance can be recovered by supplementing the electrolytic solution with the supplementary electrolytic solution when the electrolytic solution is reduced. In this case, since the electrolyte concentration of the supplemented electrolytic solution is lower than the initial concentration, the electrolytic solution is maintained at a proper electrolyte concentration even after supplement of the electrolytic solution, whereupon the cell performance can be recovered desirably.

Research on retention of cell performance has not been made sufficiently in the technical field of dye-sensitized solar cells. Accordingly, retaining the cell performance by preventing leakage and evaporation of the electrolytic solution has a great difficulty. In this case, the cell performance can be recovered by supplementing the electrolytic solution with the supplementary electrolytic solution whose electrolyte concentration is lower than the initial electrolyte concentration, when the electrolytic solution is reduced. However, a new problem arises, that is, what value the electrolyte concentration of the supplementary electrolytic solution should take. Furthermore, another problem arises, that is, what value the electrolyte concentration of the supplementary electrolytic solution should take when supplement is repeated twice, thrice and so on. More specifically, the problem is whether the same electrolyte concentration should be maintained or whether the electrolyte concentration should gradually be reduced.

The inventors further conducted experiments and research to find the relationship between lapse of time (the number of times of supplement) and a proper electrolyte concentration of the supplementary electrolytic solution. As a result, the inventors found the following relationship:

$$y = a + b * \ln x \text{ (where } a \text{ and } b \text{ are constants)} \tag{A}$$

between the number of times of supplement x and an optimum electrolyte concentration y of the supplementary electrolytic solution. In this case, it is considered that the constants a and b have different values according to types of electrolytic solution, entire structure of the solar cell (how the electrolytic solution evaporates, for example). For example, the values of constants a and b can be obtained experimentally or empirically.

An electrolytic concentration Y (mmol/dm$^3$) of the supplementary electrolytic solution to be actually used ranges as:

$$Y = y \pm d \text{ (where } d=10\text{)} \tag{B}$$

when an optimum concentration y (mmol/dm$^3$) is obtained by y=a+b*lnx (where a and b are constants). Alternatively, the electrolytic concentration Y (mmol/dm$^3$) of the supplementary electrolytic solution to be actually used ranges as:

$$(2/3)y \leq Y \leq (4/3)y \tag{C}$$

when an optimum concentration y (mmol/dm$^3$) is obtained by y=a+b*lnx (where a and b are constants). Consequently, the electrolytic solution can normally be supplemented with the electrolytic solution having a proper electrolyte concentration Y, whereupon the cell performance can be recovered desirably.

BRIEF DESCRIPTION OF THE DRAWINGS

Other objects, features and advantages of the present invention will become clear upon reviewing the following description of one embodiment with reference to the accompanying drawings, in which:

FIG. 3 shows results of an experiment on the relationship between the electrolyte concentration of the supplementary electrolytic solution and the degree of recovery rate of the cell performance;

FIG. 5 shows a second embodiment and more particularly results of an experiment on the relationship between the electrolyte concentration of the supplementary electrolytic solution and the degree of recovery rate of the cell performance in a first supplement;

FIG. 6 shows experimental results on the relationship between the electrolyte concentration of the supplementary electrolytic solution and the degree of recovery rate of the cell performance in a second supplement;

FIG. 7 shows experimental results on the relationship between the electrolyte concentration of the supplementary electrolytic solution and the degree of recovery rate of the cell performance in a third supplement;

FIG. 8 shows experimental results on the relationship between the electrolyte concentration of the supplementary electrolytic solution and the degree of recovery rate of the cell performance in a fourth supplement;

FIGS. 9A to 9D are graphs showing the experimental results regarding the relationship between the number of times of supplement and an optimum electrolyte concentration and three types of relationships in the second embodiment, respectively.

DETAILED DESCRIPTION OF THE INVENTION

First Embodiment

Figure 1A:
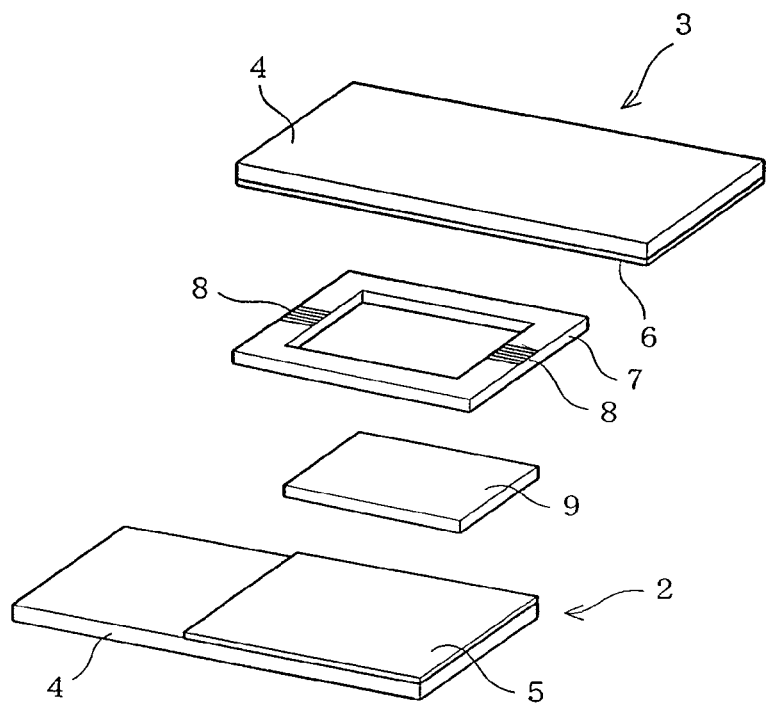
FIGS. 1A, 1B and 1C illustrate an assembling sequence of a solar cell kit of one embodiment in accordance with the present invention.

A first embodiment of the invention will be described with reference to FIGS. 1A to 3. The invention is applied to a dye-sensitized solar cell fabricating kit as an educational material used in school education. Firstly, the configuration of a dye-sensitized solar cell 1 fabricated of kit components will schematically be described.

The dye-sensitized solar cell 1 comprises a semiconductor electrode 2, an opposite electrode 3 disposed opposite the semiconductor electrode 1, and an electrolytic solution L disposed between the semiconductor electrode 2 and the opposite electrode 3 as shown in FIGS. 1A-1C and 2A and 2B. The semiconductor electrode 2 comprises a transparent conductive glass substrate 4 having a surface (upper surface as viewed in FIGS. 1A to 2B) formed into a conductive surface (a thin film of $SnO_2$) and a porous semiconductor layer 5 which comprises zinc oxide and is disposed on the surface of the conductive glass substrate 4. A sensitizing dye is carried on the semiconductor layer 5 although not shown. The opposite electrode 3 comprises another transparent conductive glass substrate 4 having a surface (underside as viewed in FIGS. 1A to 2B) which is formed into a conductive surface and has a carbon coated layer 6.

Figure 1B:
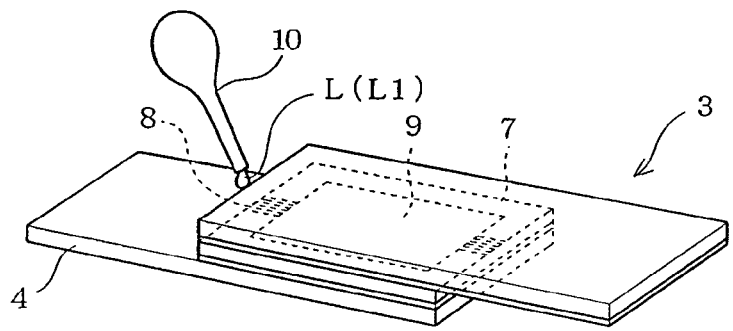
Figure 1C:
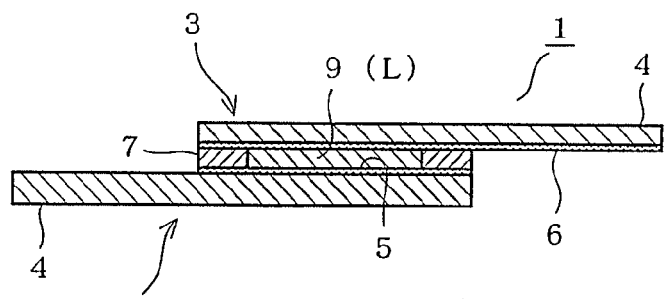

Furthermore, a rectangular frame-shaped bonding member 7 is provided between the semiconductor electrode 2 and the opposite electrode 3 with a space retaining the electrolytic solution L being defined in the embodiment, as shown in FIGS. 1A to 1C. Two inlets 8 are formed in middle portions of right and left sides of the bonding member 7 as shown in FIG. 1A. The electrolytic solution L is supplied into the inlets 8. Sealing members (not shown) such as putty are detachably attached to the inlets 8 so as to close the inlets 8 respectively. Furthermore, an electrolytic solution retaining member 9 such as gauze is disposed between the semiconductor electrode 2 and the opposite electrode 3 (a space inside the bonding member 7). The electrolytic solution retaining member 9 retains the electrolytic solution L.

Kit components of the dye-sensitized solar cell fabricating kit will now be described. The kit includes the following kit components (a) to (i):

(a) Two Transparent Conductive Glass Substrates 4

For example, a transparent conductive glass substrate A110U80 manufactured by AGC Fabritech Co., Ltd., Tokyo is employed and is cut into a 50 mm-by-30 mm rectangular shape.

(b) Zinc Electrolytic Solution (45 cm$^3$)

A zinc electrolytic solution is provided for forming the porous semiconductor layer 5 by electrocrystallization. For example, zinc nitrate hexahydrate (manufactured by Kishida Chemical Co., Ltd., Osaka, 98% degree of purity) with concentration of 0.12 mol/dm$^3$ is dissolved in purified water. Zinc nitrate hexahydrate and purified water may be contained independently.

(c) Template Compound Solution (10 cm$^3$)

A template compound solution has a catalytic action of facilitating precipitation of metal oxide in the electrocrystallization of the porous semiconductor layer 5. The template compound solution is also provided for forming a porous shape. Eosin Y (manufactured by Kishida Chemical Co., Ltd., Osaka) with concentration of $2.75 \times 10^{-4}$ mol/dm$^3$ is dissolved in purified water. Eosin Y and purified water may be contained independently.

(d) Members for Electrocrystallization

The members include two dry batteries, galvanized wire, lead wire and the like.

(e) Dye Carrying Treatment Liquid

A dye carrying treatment liquid is used to carry out a sensitizing dye carrying treatment. Eosin Y serving as a sensitizing dye with concentration of $2.75 \times 10^{-4}$ mol/dm$^3$ is dissolved in purified water. Eosin Y and purified water may be contained in the kit independently. The obtained liquid may be used in common for dye carrying treatment and for template compound solution.

(f) Two Types of Electrolytic Solutions L

For example, iodine (manufactured by Kishida Chemical Co., Ltd., Osaka; special grade chemicals) as solute with a predetermined concentration and tetra-n-propylammonium Iodide (hereinafter "TPAI" and manufactured by Kanto Chemical Co., Inc., Tokyo) as a dissolution aid with a concentration of 0.5 mol/dm$^3$ are dissolved in propylene carbonate (manufactured by Nacalai Tesque, Inc., Kyoto) as organic solvent. Two types of electrolytic solutions L are provided in the embodiment, that is, an initial supply electrolytic solution L1 and a supplementary electrolytic solution L2 both of which have different concentrations of iodine (electrolyte). The electrolytic solution L1 has an iodic concentration of 50 mmol/dm$^3$. The supplementary electrolytic solution L2 has a lower iodic concentration than the electrolytic solution L1, for example, 20 mmol/dm$^3$.

(g) A Bonding Member 7

For example, a polyester nonwoven cloth adhesion tape (B-EF56 manufactured by Nitto Shinko Corporation, Sakai) is used as a bonding member 7 and is previously Cut into a predetermined shape (two C-shaped sheets, for example).

(h) An Electrolytic Solution Retaining Member 9

Gauze cut into a rectangular shape is used as an electrolytic solution retaining member 9.

(i) Other Kit Components

Other kit components include putty to close the inlets 8, a 4B pencil to form a carbon layer 6, a dropper 10 (see FIG. 1B), a clip, an instruction manual and the like.

Furthermore, a beaker, a stirrer, a heater for heating a solution in the beaker, an oven for heating adhesion treatment and the like are used for assembly of the kit. Additionally, a circuit tester, miniature bulb and the like are used for confirmation of electric generation.

The above-described kit is assembled through the following steps (1) to (4) into the dye-sensitized solar cell 1:

(1) Fabrication of Semiconductor Electrode

Firstly, the porous semiconductor layer 5 is formed on the surface of one transparent conductive glass substrate 4. Electrocrystallization is used in this forming step. In the electrocrystallization, the aforesaid zinc electrolytic solution and the template compound solution are put into a beaker and stirred sufficiently by the stirrer so that an electrodeposited solution is prepared. The transparent conductive glass substrate 4 and the zinc wire are soaked in the electrodeposited solution in the beaker. Two dry cells are series connected so that 3V DC voltage is applied to the zinc wire serving as the anode with the glass substrate 4 serving as the cathode. Furthermore, an electrolytic solution treatment is carried out for about 8 minutes while the temperature of the solution is maintained at 70° C.

As the results of electrochemical reaction in the anode and cathode and a chemical reaction in the vicinity of the cathode, metal oxide (zinc oxide) is electrodeposited on the surface of the transparent conductive glass substrate 4 to be formed into the porous semiconductor layer 5. In this case, the template compound (dye in the embodiment) enters gaps during electrodeposition of metal oxide such that the porous shape is formed.

(2) Dye Carrying Treatment of Semiconductor Electrode

Subsequently, the semiconductor electrode 2 formed with the porous semiconductor layer 5 is soaked in the aforesaid dye carrying treatment liquid (water solution containing Eosin Y serving as a sensitizing dye with the concentration of $5 \times 10^{-4}$ mol/dm$^3$) at 70° C. for one hour. Consequently, the step of carrying the dye on the porous semiconductor layer 5 is carried out.

(3) Fabrication of the Opposite Electrode

A step of forming the carbon layer 6 on the surface (conductive surface) of the other transparent conductive glass substrate 4 is carried out. In this step, the surface of the transparent conductive glass substrate 4 is blacked out by the 4B pencil, whereby the opposite electrode 3 is formed.

(4) Assembly of Cell

Subsequently, a step of assembling the dye-sensitized solar cell 1 is carried out. As shown in FIG. 1A, the semiconductor electrode 2 is placed with the porous semiconductor layer 5 being located upside. The electrolytic solution retaining member (gauze) 9 is placed on the center of the porous semiconductor layer 5. With this, the bonding member 7 is placed on the periphery of the porous semiconductor layer 5 in a positioned state.

Subsequently, the opposite electrode 3 is placed on the bonding member 7 with the carbon coat layer 6 in contact with the bonding member 7, so that the opposite electrode 3 is temporarily joined by the clip or the like. The temporary assembly is put into an oven to be heated at 150° C. for 30 minutes, for example, whereupon the bonding member 7 is bonded and hardened.

Subsequently, the initial supply electrolytic solution L1 is dropped into the inlets 8 using a dropper 10 thereby to be absorbed into the electrolytic solution retaining member 9 (an initial electrolytic solution supply step). Upon completion of supply of the electrolytic solution L1, the inlets 8 are closed by putty. Thus, the fabrication of the dye-sensitized solar cell 1 is completed.

The dye-sensitized solar cell 1 fabricated in the above-described manner is placed outdoors so as to be subjected to natural sunlight. As a result, light energy of the natural sunlight is converted to electrical energy such that voltage is generated between both electrodes 2 and 3. The voltage was measured. In the embodiment, output of an open-circuit voltage (Voc) of 0.65 V and short-circuit current (Isc) of 0.0065 A was confirmed between the electrodes 2 and 3. This can also be confirmed by connecting a miniature bulb between the electrodes 2 and 3. When a conversion efficiency is calculated based on these measured values, the value of 0.054% is obtained.

The conversion efficiency is obtained from the following equation:

$$\text{Conversion efficiency (\%)} = Voc \times Isc \times K \times 100$$

$$K = f\!f/(Pi \times S)$$

where ff is a fill factor, Pi is an incident energy density to the cell (W/m$^2$), and S is an effective area of the solar cell (m$^2$).

A closed space retaining the electrolytic solution L is defined between the semiconductor electrode 2 and the opposite electrode 3 by the bonding member 7 and the putty in the dye-sensitized solar cell of the embodiment. Consequently, the progress in the leakage and evaporation (volatilization) of the electrolytic solution L can be suppressed. Furthermore, since the electrolytic solution retaining member 9 is disposed in the closed space, the leakage of the electrolytic solution L can further be suppressed. Moreover, since a suitable cell gap is maintained between the semiconductor electrode 2 and the opposite electrode 3, a short circuit can be prevented between the electrodes 2 and 3.

Immediately after fabrication, a constant cell performance (conversion efficiency in converting the sunlight energy to electrical power) is obtained from the above-described solar cell 1. However, since leakage and evaporation of the electrolytic solution L is unavoidable with lapse of time, the electrolytic solution L is reduced and the performance of the solar cell battery is decreased. In the solar cell 1 of the embodiment, the conversion efficiency is reduced to 0.018% (open-circuit voltage: 0.63 V and short-circuit current: 2.2 mA) after two weeks, for example.

Figure 2A:
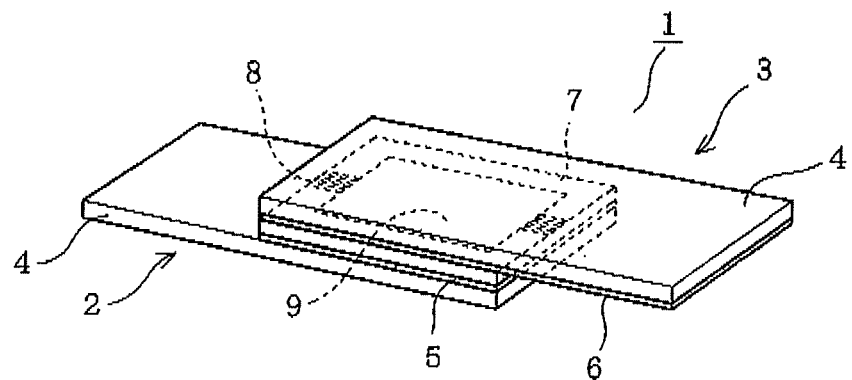
FIGS. 2A and 2B illustrate a manner of supplementing the electrolytic solution.
Figure 2B:
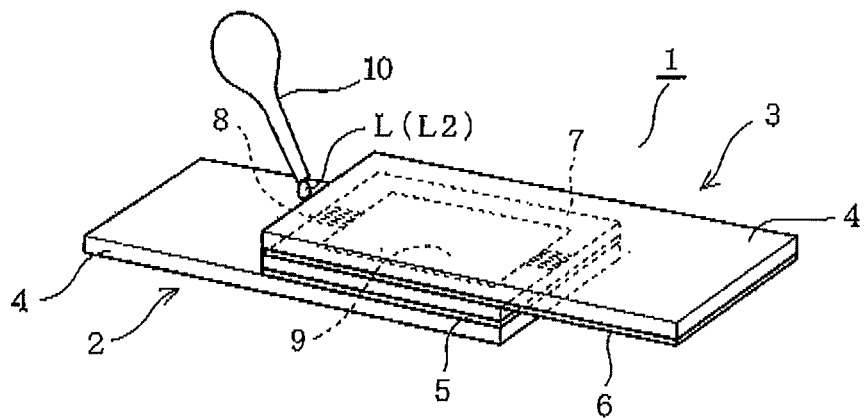

In view of the foregoing problem, when the electrolytic solution L is reduced from the state as shown in FIG. 2A with lapse of time, the electrolytic solution is supplemented with the supplementary electrolytic solution L2 in the embodiment, whereby the cell performance of the solar cell 1 can be recovered (supplementing step). In the supplement, the putty closing the each inlet 8 is removed, and the supplementary electrolytic solution L2 is absorbed by the dropper 10 to be supplied into the inlets 8 as shown in FIG. 2B. Upon completion of supply of the supplementary electrolytic solution L2, the inlets 8 are re-closed by the putty.

According to the research conducted by the inventors, the electrolyte concentration of the supplementary electrolytic solution L2 is rendered lower than the initial electrolyte concentration (the initial supply electrolytic solution L1. Accordingly, the concentration of the electrolytic solution L after supplement is maintained at a proper electrolyte concentration, whereupon the cell performance can be recovered desirably. In the embodiment, it was confirmed that the conversion efficiency was recovered to 0.051% (open-cricuit voltage: 0.65 V and short-circuit current: 6.1 mA). Furthermore, it was also confirmed that the cell performance was recovered even when the electrolytic solution of a solar cell which had resulted in electrolytic solution shortage was supplemented with the supplementary electrolytic solution L2.

The experiment conducted by the inventors shows that when the reduced electrolytic solution is simply supplemented with the electrolytic solution equivalent to that supplied during assembly (initial supply electrolytic solution L1), the degree of recovery of the cell performance is low. On the other hand, when the electrolyte concentration of the supplementary electrolytic solution L2 is rendered lower than the initial electrolyte concentration as in the embodiment, the cell performance can be recovered well. It is educed that since the reduction of the electrolytic solution L is mainly due to volatilization of the solvent, the concentration of the electrolytic solution L is increased or the electrolytic solution L is concentrated. It is further educed that when the electrolytic solution L is supplemented so as to be thinned, the electrolytic solution L is maintained at a suitable electrolyte concentration.

The following describes an experiment the inventors conducted to inspect the relationship between the electrolyte concentration of the supplementary electrolytic solution L2 and the degree of recovery rate of the cell performance (conversion efficiency). As shown in FIG. 3, an iodic concentration of the initial supply electrolytic solution L1 supplied during the assembly was at 50 mmol/dm³, and a fabricated solar cell 1 was stored in a room at 25° C. for two weeks. Thereafter, a short-circuit current and open-circuit voltage were measured and a conversion efficiency was obtained from the measured short-circuit current and open-circuit voltage. In this case, eight types of supplementary electrolytic solutions L2 were prepared. The supplementary electrolytic solutions L2 had different iodic concentrations, that is, 0 mmol/dm³ (only solvent without electrolyte), 1 mmol/dm³, 5 mmol/dm³, 10 mmol/dm³, 20 mmol/dm³, 30 mmol/dm³, 40 mmol/dm³, and 50 mmol/dm³ (equal to the initial supply electrolytic solution L1). Furthermore, a dissolution aid (TPAI) with a concentration of 0.5 ml/dm³ was contained in each supplementary electrolytic solution.

Figure 4:
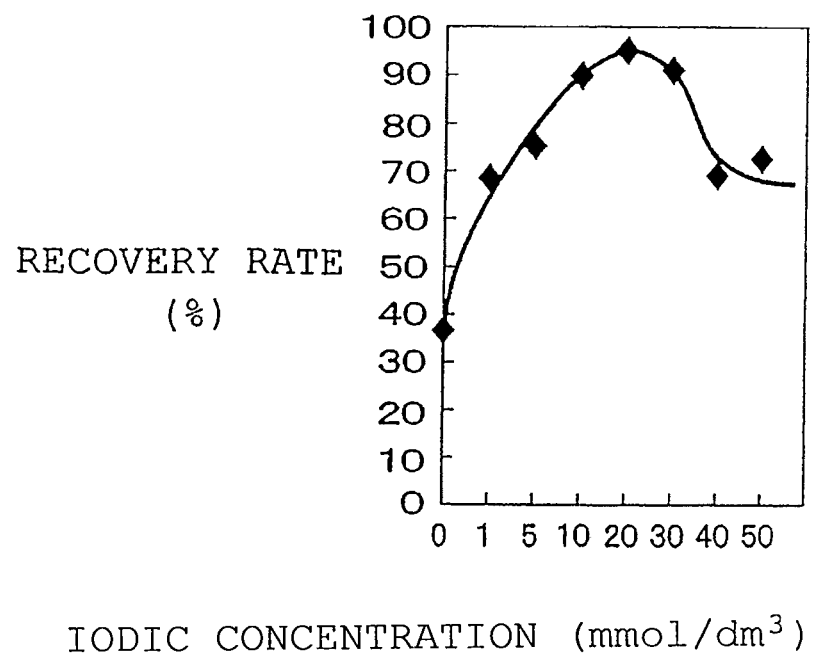
FIG. 4 is a graph showing the results of an experiment regarding the relationship between the concentration of supplementary electrolytic solution and recovery rate.

FIG. 3 shows results of the foregoing experiment and more specifically, percentages of conversion efficiency after supplement of the electrolytic solution L when the conversion efficiency of the solar cell 1 immediately after assembly is at 100. Furthermore, FIG. 4 is a graph showing the results in which an axis of abscissas denotes the supplementary electrolytic solution L2 and an axis of ordinate indicates the recovery rate (%).

As obvious from the experimental results, favorable recovery rates are obtained when the iodic concentration of the supplementary electrolytic solution L2 is at 10, 20 and 30 mmol/dm³. Accordingly, when the electrolyte concentration of the supplementary electrolytic solution L2 ranges from 20% to 60% of the iodic concentration of the initial supply electrolytic solution L1 (50 mmol/dm³ in this case), it is understood that higher recovery rate can be achieved. It is also understood from FIG. 4 that a range from 30% to 50% is more preferable. Additionally, the recovery rate is higher when the iodic concentration has the values other than 0 mmol/dm³. The reason for this is that iodine serving as the solute actually evaporates as well as the solvent such that an amount of iodine is reduced and the iodine is also supplemented.

FIGS. 5 to 10 illustrate a second embodiment of the invention. In the second embodiment, too, the invention is applied to the dye-sensitized solar cell 1 similar to that of the first embodiment as described above. In the second embodiment, when the electrolytic solution L reduces with lapse of time, for example, two weeks, the electrolytic solution L is supplemented with the supplementary electrolytic solution L2 which has a lower electrolyte concentration than the initial supply electrolytic solution L1. As a result, the cell performance of the solar cell 1 is recovered. In this case, an electrolyte concentration Y (mmol/dm³) of the supplementary electrolytic solution at an x-th electrolytic solution supplement ranges as:

$$(2/3)y \leq Y \leq (4/3)y \quad (B)$$

when an optimum concentration y (mmol/dm³) is obtained by:

$$y = a + b * \ln x \text{ (where } a \text{ and } b \text{ are constants)} \quad (A)$$

More specifically, in the dye-sensitized solar cell of the embodiment, equation (A) is shown as:

$$y = 20 + 7.8 * \ln x \quad (A')$$

Furthermore, the number of times x can be converted to a time such as day X. More specifically, the number of times can be converted as x (times)=f*X (day). In the embodiment, f=(1/14). Still more specifically, in the embodiment, the iodic concentration of the initial supply electrolytic solution L1 is at 50 mmol/dm³ and the iodic concentration of the first supplementary electrolytic solution supplied two weeks later was at 20 mmol/dm³. The iodic concentration of the second supplementary electrolytic solution supplied further two weeks later (four cumulative weeks later) was at 25 mmol/dm³. Furthermore, the iodic concentration of the third supplementary electrolytic solution supplied still further two weeks later (six cumulative weeks later) was at 30 mmol/dm³. Yet still furthermore, the iodic concentration of the fourth supplementary electrolytic solution supplied still further two weeks later (eight cumulative weeks later) was at 30 mmol/dm$^3$. Consequently, the best recovery rate was achieved.

According to the experiments and research both carried out by the inventors, gradually increasing the iodic concentration with increase in the number of times of electrolytic solution supplement is effective for recovery of the cell performance. An optimum concentration y (mmol/dm$^3$) of the supplementary electrolytic solution at the x-th electrolytic solution supplement can be obtained by aforesaid equation (A). In the case of the dye-sensitized solar cell 1 of the embodiment, the values of constants a and b are 20 and 7.8 respectively.

Furthermore, when the supplementary electrolytic solution concentration Y is set so as to be in a range from −33% to +33% relative to the optimum concentration y (foregoing equation (C)), good recovery of the cell performance can be achieved. Of course, the supplementary electrolytic solution concentration Y should range so as not to exceed the electrolyte concentration of the initial supply electrolytic solution (the iodic concentration of the initial supply electrolyte L1, 50 mmol/dm$^3$) although within the range of equation (C). The electrolyte concentration Y (optimum concentration y) does not have the value of zero.

As described in the first embodiment, when it is only taken into consideration that the reduction of electrolytic solution L is mainly due to volatilization of the solvent, the electrolyte concentration of the supplementary electrolytic solution should gradually be rendered thinner with increase in the number of times of supplement. However, as the results of the experiments conducted by the inventors, contrarily, it has become clear that the electrolyte concentration is gradually increased with increase in the number of times of supplementing.

The following describes the experiment conducted by the inventors and the experimental results. As shown in FIGS. 5 to 8 which will be described later, the iodic concentration of the electrolytic solution supplied in the assembly (initial supply electrolytic solution L1) was set at 50 mmol/dm$^3$ in the experiment as in the first embodiment. The fabricated solar cell 1 was preserved in the room at 25° C. The electrolytic solution was supplemented with the supplementary electrolytic solution having various values of iodic concentration every lapse of two weeks, whereby the conversion efficiency (recovery rate) was obtained. The reference symbol M designates the unit of concentration, mol/dm$^3$ in FIGS. 5 to 10.

Figure 10A:
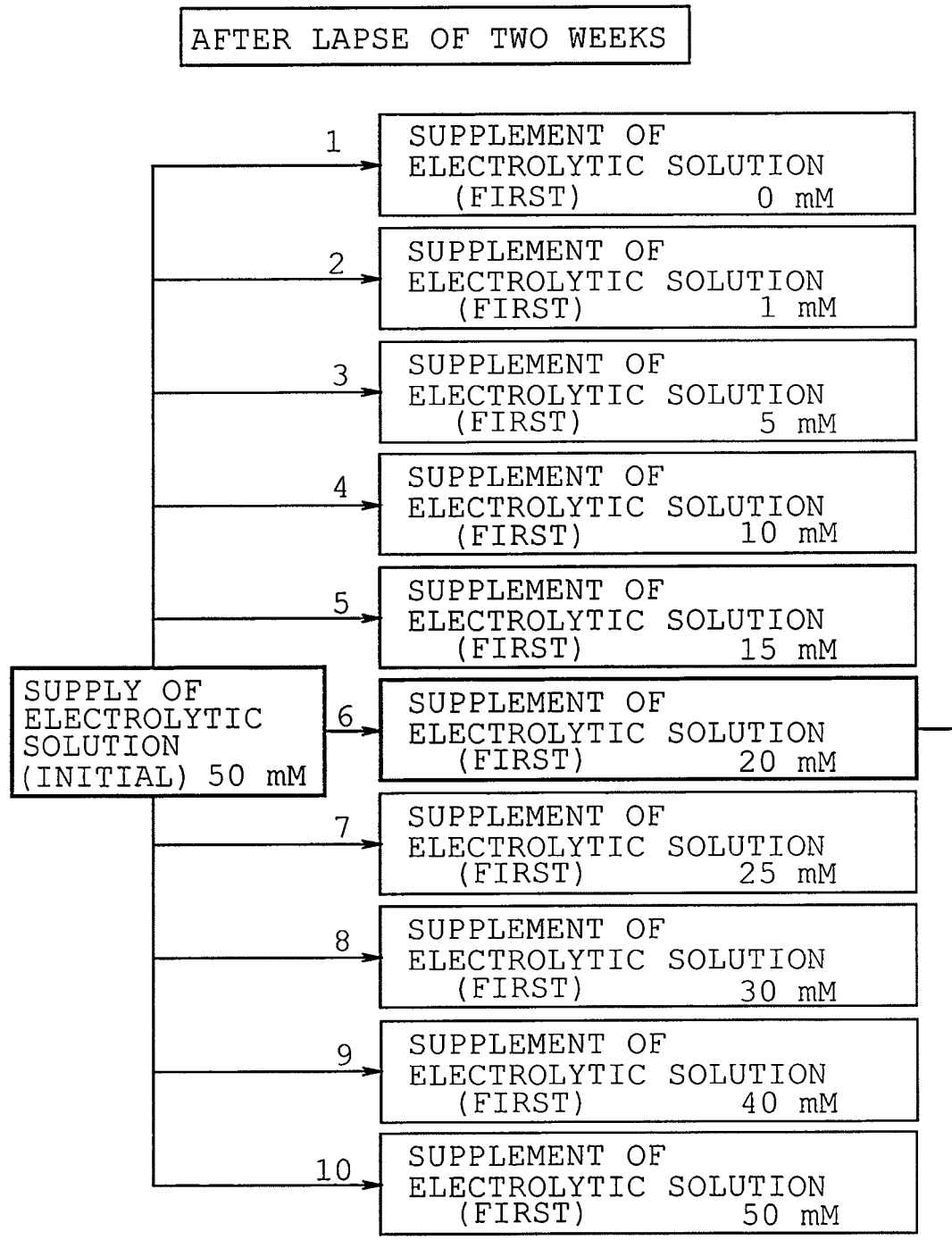
FIG. 10 illustrates the relationship between experiment numbers and electrolyte concentration of supplementary electrolytic solution.
Figure 10B:
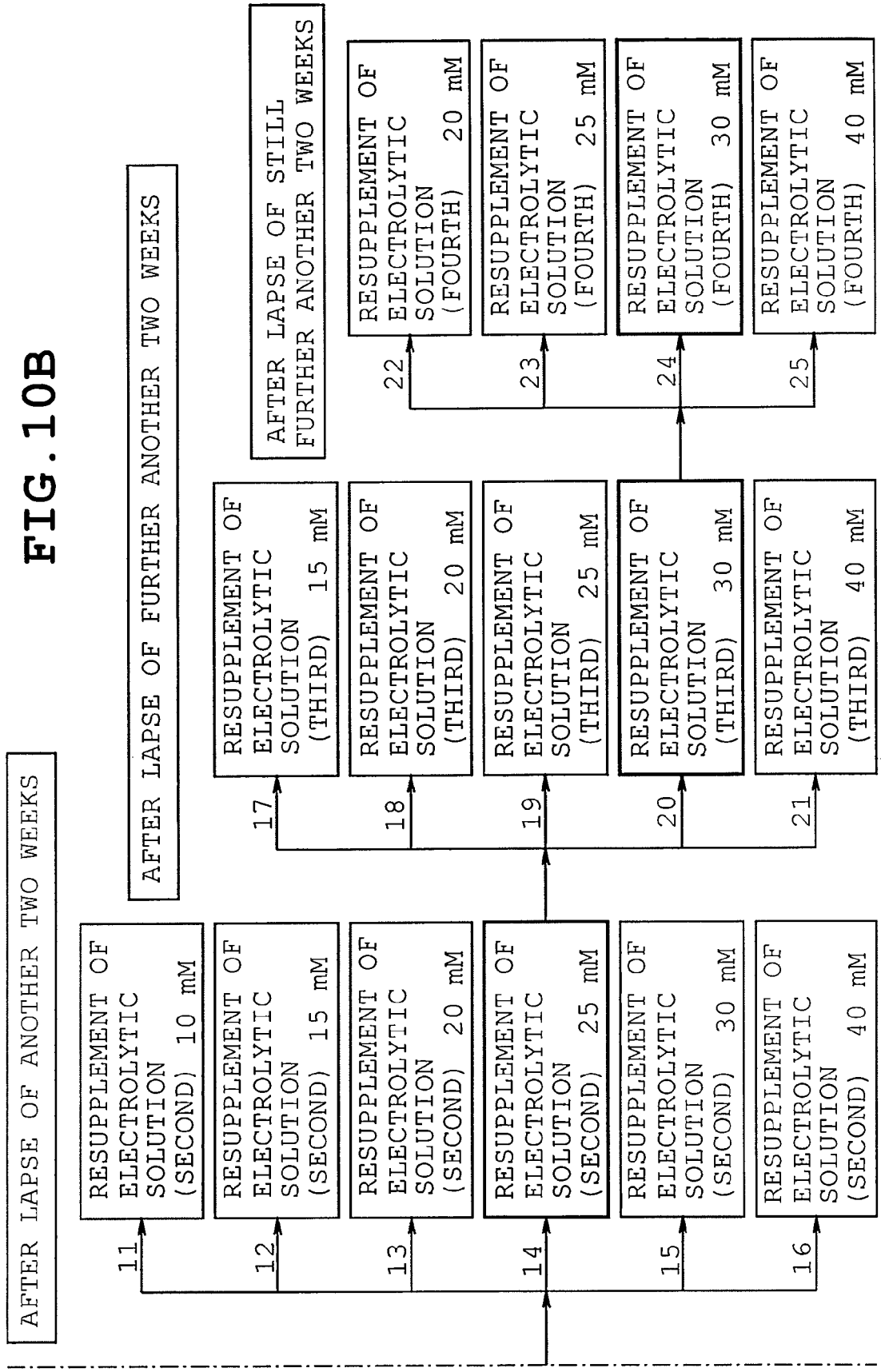

As shown in FIGS. 5 and 10, regarding the first supplement of the electrolytic solution two weeks later, the electrolytic solution was supplemented with electrolytic solution with 10 types of iodic concentrations of experimental run numbers 1 to 10. The experiment partially overlapped the experiment in the first embodiment. The percentage of conversion efficiency of the electrolytic solution was obtained as recovery rate when a conversion efficiency of the solar cell 1 immediately after assembly was 100. Each type of electrolytic solution contained the dissolving assistant (TPAI) with the concentration of 0.5 mol/dm$^3$. FIG. 5 shows the experimental results regarding the first supplement of electrolytic solution. In this case, the best result was obtained from the supplementary electrolytic solution with the iodic concentration of 20 mmol/dm$^3$.

Then, as shown in FIGS. 6 and 10, a second supplement of electrolytic solution was carried out for the solar cells 1 which had been supplemented with the supplementary electrolytic solution having the iodic concentration of 20 mmol/dm$^3$, using the electrolytic solutions with the iodic concentrations of experimental run numbers 11 to 16. FIG. 6 shows the experimental results regarding the second supplement of electrolytic solution. In this case, the best result was obtained from the supplementary electrolytic solution with the iodic concentration of 25 mmol/dm$^3$.

Similarly, as shown in FIGS. 7 and 10, a third supplement of electrolytic solution was carried out further two weeks later for the solar cells 1 which had been supplemented with the supplementary electrolytic solution having the iodic concentration of 25 mmol/dm$^3$, using the electrolytic solutions with the iodic concentrations of experimental run numbers 17 to 21. FIG. 7 shows the experimental results regarding the third supplement of electrolytic solution. In this case, the best result was obtained from the supplementary electrolytic solution with the iodic concentration of 30 mmol/dm$^3$.

Finally, as shown in FIGS. 8 and 10, a fourth supplement of electrolytic solution was carried out still further two weeks later for the solar cells 1 which had been supplemented with the supplementary electrolytic solution having the iodic concentration of 30 mmol/dm$^3$, using the electrolytic solutions with the iodic concentrations of experimental run numbers 22 to 25. FIG. 8 shows the experimental results regarding the third supplement of electrolytic solution. In this case, the best result was obtained from the supplementary electrolytic solution with the iodic concentration of 30 mmol/dm$^3$.

As obvious from the foregoing experimental results, the relationship between the number of times of electrolytic solution supplement x and an optimum concentration y (mmol/dm$^3$) of the supplementary electrolytic solution is obtained as:

$$y=20+7.8*\ln x. \quad (A')$$

Furthermore, the electrolytic concentration Y (mmol/dm$^3$) of the actual supplementary electrolytic solution ranges as:

$$(2/3)y \leq Y \leq (4/3)y. \quad (C)$$

It is clear that the cell performance can be recovered well when the electrolytic concentration Y is within this range.

FIG. 9A is a graph showing the results in which an axis of abscissas denotes the number of times of electrolytic solution supplement (lapsed time) and an axis of ordinate indicates the optimum electrolyte concentration for recovery of cell performance. The inventors examined the relationship between the number of times of electrolytic solution supplement and an optimum electrolyte concentration from the experimental result. When a relational expression is obtained between the number of times of electrolytic solution supplement x and the optimum concentration y by approximation from form FIG. 4, the following three relations are considered. More specifically, the relation in which the value of y is linearly increased relative to x as shown in FIG. 9B, the relation in which the value of y is gradually increased while drawing a curve in a manner of logarithmic function as shown in FIG. 9C, or the relation in which the value of y is once increased and thereafter decreased while drawing a parabolic curve as shown in FIG. 9D.

One of the purposes of supplementing the electrolytic solution is to make up for lost electrolytic solution and at the same time to control the electrolytic solution of the solar cell 1 so that an optimum electrolyte concentration is maintained (50 mmol/dm$^3$ in the iodic concentration). In the straight-line approximation of FIG. 9B, the optimum iodic concentration y exceeds the initial electrolyte concentration or an optimum electrolyte concentration for the dye-sensitized solar cell when the number of times of supplement x is increased, whereupon an inconsistency occurs. Accordingly, FIG. 9B is improper as the relational expression.

Next, the following describes a mechanism from the performance degradation of the solar cell 1 due to loss of electrolytic solution until recovery of cell performance of the solar cell 1 after supplement of electrolytic solution. The solar cell 1 loses the electrolytic solution due to volatilization with lapse of time after fabrication thereof. As a result, the electrolytic solution in the solar cell 1 is concentrated such that the electrolyte concentration (iodic concentration) is increased. Iodide ion ($I_3^-$) in the electrolytic solution has an effect of blocking off light. Accordingly, when the iodic concentration is increased, an amount of light incident on the electrode of the solar cell 1 is reduced, whereupon the cell performance is reduced. Furthermore, the decrease in an amount of electrolytic solution forms void in part of the solar cell 1. The void reduces an effective area of the solar cell 1, thereby decreasing the cell performance.

When the solar cell 1 whose electrolytic solution has been reduced is supplemented with electrolytic solution, the solar cell 1 is filled with the electrolytic solution such that the effective area thereof is recovered and at the same time, the concentrated electrolytic solution is thinned into the electrolytic solution with an optimum iodic concentration. Consequently, the cell performance is recovered. However, iodine is also lost by volatilization as well as the electrolytic solvent in the process of concentration of the electrolytic solution as the result of loss of electrolytic solution. Accordingly, the cell performance cannot efficiently be recovered when the supplementary electrolytic solution does not contain a certain amount of iodide ion.

Furthermore, it is considered that iodide ion can be precipitated as iodine ($I_2$) other than by volatilization in the process of electrolyte concentration. When iodide ion is precipitated as iodine, the iodine forms into lumps (cores). Each core is small in its initial state (when the value of x is small) and is re-dissolved in the process of electrolytic solution supplement, thereby returning to iodine.

However, it is considered that when the value of x is increased, that is, when precipitation and dissolution of iodine in the solar cell I are repeated, the core of iodine that does not dissolve in the electrolytic solution is rendered larger. When the core becomes large, a surface area of iodine is reduced. Accordingly, an amount of iodine dissolving is reduced in the supply of supplementary electrolytic solution. As a result, an amount of iodine serving as an electrolyte component (iodide ion) although an amount of iodine present in the solar cell 1 is sufficient. Thus, it is considered that a supplementary electrolytic solution with a higher iodic concentration is necessary as the number of times of supplement x is increased. Accordingly, FIG. 9D is not proper as the relational expression.

The above can be summarized as follows. Larger iodic cores are scattered about in the solar cell 1 as the value of x becomes large. Accordingly, it is considered that an optimum iodic concentration of the supplementary electrolytic solution is increased but does not exceed 50 mmol/dm$^3$. More specifically, a reasonable relational expression between the number of times of electrolytic solution supplement x and the optimum iodic concentration y is shown in FIG. 9C. The constants a and b in expression (A) are considered to have different values according to a whole structure of the solar cell (how electrolyte evaporates, etc.) and can be obtained experimentally or empirically, for example.

According to the foregoing embodiment, the electrolyte concentration Y of the supplementary electrolytic solution ranges as $(2/3)y \leq Y \leq (4/3)y$ relative to the optimum concentration y (mmol/dm$^3$) obtained from the above-described equation (A) or (A'). Accordingly, the electrolytic solution of the solar cell 1 can normally be supplemented with the supplementary electrolytic solution with the proper electrolyte concentration Y. Consequently, the cell performance can be recovered well and accordingly, a higher cell performance can be maintained for a long period of time.

In the foregoing second embodiment, the electrolyte concentration Y of the supplementary electrolytic solution ranges as $(2/3)y \leq Y \leq (4/3)y$ when y is the optimum concentration by mmol/dm$^3$ and is obtained from the above-described equation (A) or (A'). However, the electrolyte concentration Y may range as:

$$Y = y \pm d \tag{B}$$

when y is an optimum concentration and d=10. In this case, the same effect as achieved from the second embodiment can also be achieved. Furthermore, it is preferable that the electrolyte concentration Y of the supplementary electrolytic solution ranges as $Y = y \pm 6.7$ from the aforesaid experimental result. Furthermore, it is further preferable that the electrolyte concentration Y ranges as $0.95y \leq Y \leq 1.05y$. It is still further preferable that the electrolyte concentration Y ranges as $Y = y \pm 1.4$.

The invention should not be limited to the foregoing embodiments. The embodiments may be expanded or modified as follows. Although iodine ($I_2$) is used as the electrolyte (solute) in each embodiment, another electrolyte such as bromine ($Br_2$). When bromine is used as the electrolyte, an optimum electrolyte concentration of the initial supply electrolytic solution becomes 40 mmol/dm$^3$.

Although the invention is applied to the fabrication kit for learning in each embodiment, the invention may be applied to industrially manufactured dye-sensitized solar cells. In this case, when the electrolytic solution is reduced after assembly, the initial supply electrolytic solution may be supplemented with the electrolytic solution with a lower electrolyte concentration than that of the initial supply electrolytic solution. Consequently, the cell performance can be recovered well.

In the first embodiment, the kit components include the initial supply electrolytic solution L1 with high electrolyte concentration and the supplementary electrolytic solution L2 with the lower concentration than that of the initial supply electrolytic solution L1. The kit components thus include two types of electrolytic solution individually. However, the kit components may include a solvent and electrolyte (solute) individually so that the user can adjust the electrolytic solution with a desired concentration. Alternatively, the kit components may include an electrolytic solution with a higher electrolyte concentration and a thinner for thinning the electrolytic solution both of which are contained individually. In this case, too, the electrolyte concentration may be adjusted freely. In each case, the user can easily adjust the initial supply electrode with the target concentration and the supplementary electrolytic solution.

The electrodeposition is used as the method of forming the semiconductor layer 5 on the surface of the semiconductor electrode 2 in each embodiment. However, a paste containing semiconductor particles and a binder may be applied to a substrate and pressurized and heated (burned by a burner) thereby to be formed into a semiconductor layer. In this case, various known materials such as Ti, Zr, Fe or the like may be employed as a material of the semiconductor layer, other than zinc oxide. Furthermore, the kit components may include a semiconductor electrode provided with a semiconductor layer.

A transparent plastic substrate may be used as the material for the semiconductor electrode and opposite electrode, instead of the glass substrate. A metal such as platinum or a metal oxide with conductivity may be used as a material for an electrode portion of the opposite electrode. Various known materials may be used for a material for the electrolyte (solute or electrolyte) or a material for the sensitizing dye such as ruthenium bipyridine dye, coumarin dye, gardenia dye or the like.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A dye-sensitized solar cell fabricating kit for fabricating a dye-sensitized solar cell, comprising:
    a semiconductor electrode having a semiconductor layer carrying a dye;
    an opposite electrode for bonding with the semiconductor electrode to form a liquid retention region between the semiconductor electrode and the opposite electrode, the opposite electrode and semiconductor electrode being configured to form the liquid retention region in such a manner to allow for an inlet through which an electrolytic solution can be supplied to the liquid retention region;
    a sealing member detachably attachable to the inlet, and configured for the closing of the inlet;
    a supply of initial electrolytic solution comprising an electrolyte dissolved in a solvent at a first electrolyte concentration and designed to be supplied between the semiconductor electrode and the opposite electrode during an initial assembly of a solar cell, and
    a supply of supplementary electrolytic solution provided independent of the supply of initial electrolytic solution, and designed to be supplied as a replenishment after the initial electrolytic solution is reduced in amount, the supplementary electrolytic solution comprising an electrolyte dissolved in a solvent at a second electrolyte concentration that is less than the first electrolyte concentration,
    wherein the second electrolyte concentration is a concentration amount designed to be supplied to a solar cell formed with the initial electrolyte solution, after a preset period of time during which the initial electrolyte solution has undergone volatilization, the second electrolyte concentration being effective to return the solar cell to at least 90% energy conversion efficiency relative to the energy conversion efficiency of the solar cell prior to the preset period of time,
    wherein the second electrolyte concentration (Y) and the first electrolyte concentration (C) satisfy the relationship $(0.2C \leq Y \leq 0.6C)$.

2. The dye-sensitized solar cell fabricating kit of claim 1, further comprising a bonding member for bonding the semiconductor electrode and the opposite electrode to form the liquid retention region, for defining a space to retain electrolytic solution between the semiconductor electrode and the opposite electrode, while allowing for the inlet to the liquid retention region.

3. The dye-sensitized solar cell fabricating kit of claim 1, further comprising an electrolytic solution retaining member for positioning in the liquid retention region between the semiconductor electrode and the opposite electrode to retain electrolytic solution.

4. The dye-sensitized solar cell fabricating kit of claim 2, further comprising an electrolytic solution retaining member for positioning in the liquid retention region between the semiconductor electrode and the opposite electrode to retain electrolytic solution.

5. The dye-sensitized solar cell fabrication kit of claim 1, wherein the semiconductor electrode and opposite electrode are configured to form the liquid retention region in such a manner to allow for multiple inlets to the liquid retention region, and the kit comprises a corresponding number of detachably attachable sealing members.

6. The dye-sensitized solar cell fabrication kit of claim 1, wherein said sealing member is a removable body of putty.

7. The dye-sensitized solar cell fabricating kit of claim 1, wherein the second electrolyte concentration (Y) and the first electrolyte concentration (C) satisfy the relationship $(0.3C \leq Y \leq 0.5C)$.

* * * * *